W. JONES.
APPARATUS FOR THE PRODUCTION OF OXYGEN AND HYDROGEN GASES.
APPLICATION FILED OCT. 16, 1913.
1,212,229.
Patented Jan. 16, 1917.
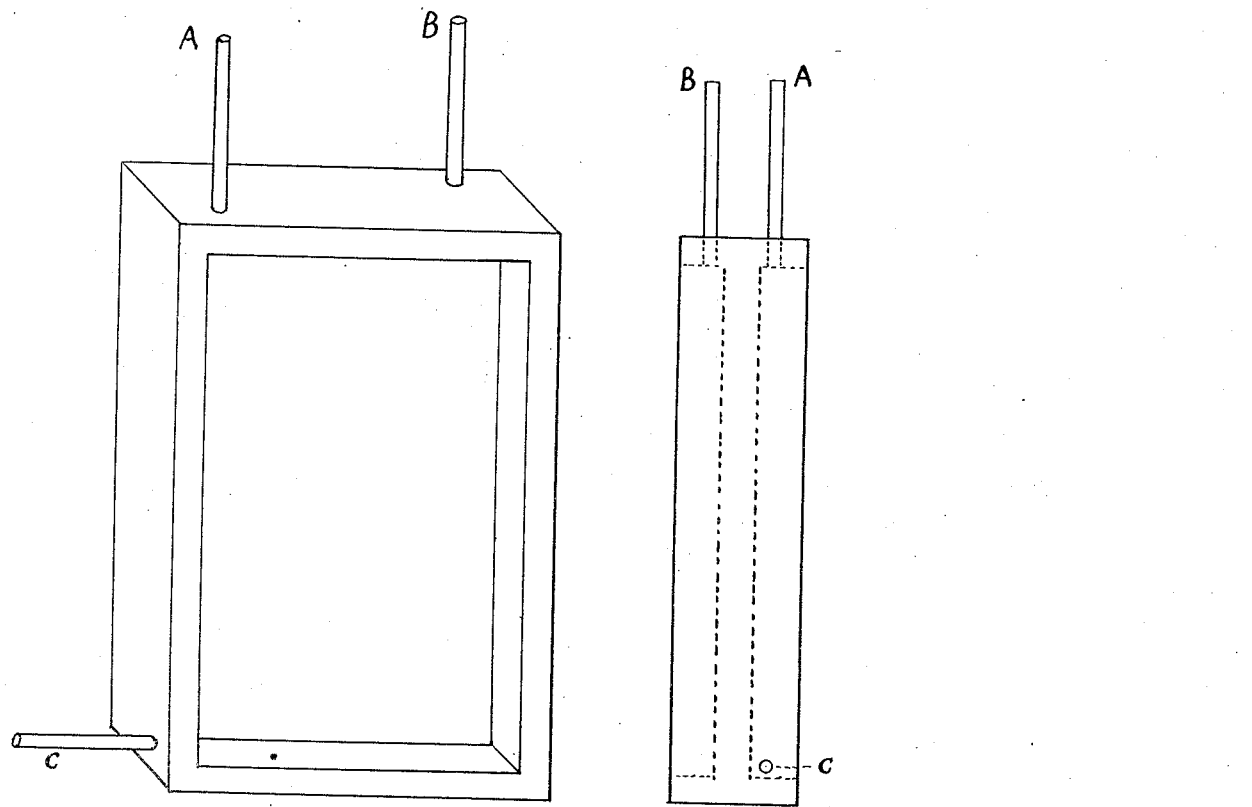

UNITED STATES PATENT OFFICE.

WILLIAM JONES, OF NEW YORK, N. Y.

APPARATUS FOR THE PRODUCTION OF OXYGEN AND HYDROGEN GASES.

1,212,229. Specification of Letters Patent. Patented Jan. 16, 1917.

Application filed October 16, 1913. Serial No. 795,515.

*To all whom it may concern:*

Be it known that I, WILLIAM JONES, a subject of Great Britain, residing at No. 11 Wadsworth avenue, in the city of New York, in the county of New York and State of New York, have invented a new and useful Apparatus for the Production of Oxygen and Hydrogen Gases.

My invention relates to the production of oxygen and hydrogen gases by the electrolysis of water.

This method of producing these gases is not new, there being two distinct forms of apparatus used in their production. One consists of independent cells, which are complete in themselves, having two electrodes separated with a diaphragm, the two gases being drawn from their respective sides of this diaphragm. The other form of apparatus is composed of plates set with diaphragms between them, so as to form separate compartments for the gases. These plates have apertures at the upper corners, and in the center at the bottom, which when the plates are placed together form a channel for each gas at the top and for the entrance of the water at the bottom, openings being made in the metal to allow the gases and water to pass from and into the different chambers. These plates are placed in series so that one side is positive and the other side is negative, while the electric current passes through the series of such plates. This plate or electrode is described in Patent #981102, dated Jan. 10th, 1911.

The first form of apparatus, or the independent cell gives very pure gases, but the cost of the plant is high, and it takes up considerable space. The second apparatus, costs must less and takes up less room, but the gases are not so pure. This is on account of a small portion of the current passing from one plate or electrode to the other through the electrolyte contained in all or some of these internal channels and so producing both gases in the same channel which can enter either compartment, thus producing a gas which is impure and which might be dangerous to compress into cylinders.

One object of my invention is to overcome this tendency for the gases to become mixed and still use the cheaper form of apparatus.

I attain one object of my invention by making my electrode without any openings which form channels containing the electrolyte and which are in the path of the electric current through the apparatus. According to my invention the gases are passed off through tubes or ducts to conduits and the electrolyte is supplied through tubes or ducts from a conduit, these conduits being outside the path of the electric current through the apparatus. For this purpose the conduits are preferably located beyond the electrodes so that there is no way for the current to form any gases within the conduits or elsewhere except within the respective cells or chambers between the electrodes nor for the production of a mixed or impure gas.

It is also found that in using iron for these electrodes, that the plate is slowly corroded by the oxygen as it is formed.

Another object of my invention is to correct this corrosion of the electrode. I accomplish this by plating or coating the electrode on one side with nickel which I find is not acted upon by the oxygen and, therefore, prevents the corrosion of the metal which would otherwise be produced.

I am aware as above stated that these gases are produced as described. First in individual cells, where the gases are taken from each compartment, and second, in the apparatus formed by plates, where the gases are conducted through internal channels. But I am not aware that any apparatus is, or has been used which is constructed of plates, and in which the evolved gases are discharged from the several cells or compartments through ducts connecting with conduits and in which the electrolyte is supplied to the several cells or compartments through ducts connecting with the liquid supply conduit, these several conduits being outside the path of the electric current through the apparatus and located beyond the electrodes. I am also unaware that nickel has been used for electrodes.

In the drawing submitted my electrode is shown in perspective and side elevation, showing how the different tubes are placed.

A and B are pipes for drawing off the gases as they are formed.

C is the pipe for the supply of water.

I claim:

1. A bi-polar electrode of the character described designed to be used in series and in which there are no openings to form internal channels arranged to contain the electrolyte.

2. An electrolytic apparatus of the character described embodying therein a plurality of electrodes and a diaphragm between adjoining electrodes forming separate chambers for the separation of the different gases evolved, gas ducts leading from the several chambers, and separate conduits connecting with said gas ducts and so arranged as to be outside of the path of the electric current through the apparatus.

3. An electrolytic apparatus of the character described embodying therein a plurality of electrodes and a diaphragm between adjoining electrodes forming separate chambers for the separation of the different gases evolved, supply ducts for the electrolyte leading to the several chambers, a supply conduit connecting with said supply ducts and so arranged as to be outside the path of the electric current through the apparatus.

4. An electrolytic apparatus of the character described embodying therein a plurality of electrodes and a diaphragm between adjoining electrodes forming separate chambers for the separation of the different gases evolved, gas ducts leading from the several chambers and separate conduits connecting with said gas ducts, supply ducts for the electrolyte leading to the several chambers, and a supply conduit connecting with said supply ducts, said conduits being located beyond the electrodes and so arranged as to be outside the path of the electric current through the apparatus.

WILLIAM JONES.

DISCLAIMER.

1,212,229.— *William Jones*, New York, N. Y. APPARATUS FOR THE PRODUCTION OF OXYGEN AND HYDROGEN GASES. Patent dated January 16, 1917. Disclaimer filed September 1, 1917, by the patentee.

By way of disclaimer—

"Hereby limits the word 'electrodes' occurring in line 3 of claims 2 and 3 of said patent to *bi-polar electrodes*."

[*Official Gazette September 18, 1917.*]

DISCLAIMER.

1,212,229. *William Jones*, New York, N. Y. Apparatus for the Production of Oxygen and Hydrogen Gases. Patent dated January 16, 1917. Disclaimer filed September 30, 1919, by the patentee.

"Enters this disclaimer—

"To claims Nos. 2 and 3 of said Letters Patent."

[*Official Gazette, October 21, 1919.*]